United States Patent Office 3,352,862
Patented Nov. 14, 1967

3,352,862
3,5,6-SUBSTITUTED URACILS
Harvey M. Loux, Hockessin, Del., assignor to E. I. du Pont de Nemours and Company, Wilmington, Del., a corporation of Delaware
No Drawing. Original application Aug. 17, 1962, Ser. No. 217,521, now Patent No. 3,235,357, dated Feb. 15, 1966. Divided and this application Dec. 27, 1965, Ser. No. 516,687
9 Claims. (Cl. 260—260)

This application is a division of copending application Ser. No. 217,521, filed Aug. 17, 1962, and now U.S. Patent No. 3,235,357, which in turn is a continuation-in-part of the following applications, now abandoned: application Ser. No. 159,746, filed Dec. 15, 1961; application Ser. No. 84,980, filed Jan. 25, 1961; application Ser. No. 48,837, filed Aug. 11, 1960; application Ser. No. 12,959, filed Mar. 7, 1960; and application Ser. No. 833,704, filed Aug. 14, 1959.

This invention relates to novel 3,5,6-substituted uracils and their alkali metal and quaternary ammonium salts. More specifically, the present invention is directed to uracil compounds of the formula

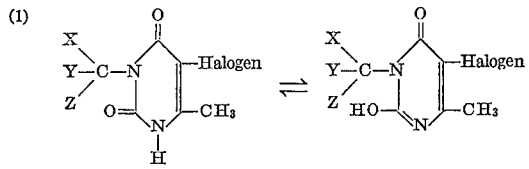

where:
X is methyl or ethyl;
Y is hydrogen or methyl; and
Z is an alkyl group of 1 through 6 carbon atoms, and Halogen includes fluorine, bromine, chlorine, and iodine.

Also included within the invention are the salts of the uracils of Formula 1 formed with such cations as sodium, potassium, lithium, and quaternary ammonium.

The compounds of this invention represent an outstanding group of herbicides offering a new and effective method for the control of undesirable vegetation. These compounds are unique in that they exert their action against both broadleaf and grass weeds, are effective against hard-to-kill nutsedge and perennial grasses such as quack grass, Johnson grass, and Bermuda grass, and are effective on highly adsorptive substrates such as railroad ballast, heavy clay soil, and soils high in organic matter.

This combination of properties makes these compounds useful wherever general weed control is required, such as industrial areas, railroad rights-of-way, and areas adjacent to croplands in agricultural areas.

Especially preferred for their outstanding herbicidal effectiveness are the following compounds of the invention:

5-bromo-3-sec-butyl-6-methyluracil
5-bromo-3-sec-butyl-6-methyluracil, sodium salt
5-chloro-3-sec-butyl-6-methyluracil
5-bromo-3-tert-butyl-6-methyluracil
5-chloro-3-tert-butyl-6-methyluracil
5-bromo-3-(3-pentyl)-6-methyluracil
5-chloro-3-(3-pentyl)-6-methyluracil
5-bromo-3-[2-(3-methylpentyl)]-6-methyluracil
5-chloro-3-[2-(3-methylpentyl)]-6-methyluracil
5-bromo-3-isopropyl-6-methyluracil
5-chloro-3-isopropyl-6-methyluracil.

Certain of the compounds of the invention also exhibit selective hericidal action in crops. By properly selecting a uracil of the invention and a rate and time of application, annual grass and broadleaf seedlings in such crops as asparagus, corn, flax, sugar cane, pineapple, safflower, peanuts, citrus, alfalfa, strawberries, gladiolus, and stone fruits can be controlled.

By proper selection of rate and time of application, certain of the compounds can also be used to control weeds growing in dormant crops.

This selective activity and activity on weeds growing in dormant crops is described in more detail in the examples.

The precise amounts of the compounds to be used in any given situation will, of course, vary according to the particular end result desired, the use involved, the plant and soil involved, the formulation used, the mode of application, prevailing weather conditions, foliage density and like factors. Since so many variables play a role, it is not possible to indicate a rate of application suitable for all situations. Broadly speaking, the compounds are used at levels of about ¼ pound per acre to about 25 pounds per acre. For selective weed control in crops, rates of ¼ to 8 pounds per acre will generally be used. More of the active material can be used to control difficult-to-kill species growing under adverse conditions. Economic factors, such as inaccessibility of the area to be treated, e.g., fire breaks in forests, may also favor higher rates, with less frequent treatments.

The compounds of the invention are also found effective against many aquatic weeds, including algae.

The compounds of this invention are strong absorbers of ultraviolet radiation. For example, 5-bromo-3-sec-butyl-6-methyluracil has strong end absorption at about 220 mu and additionally has a broad absorption peak with a maximum at 277 mu. Its extinction coefficient is nearly 8000.

Compounds of the invention are, therefore, useful as ultraviolet screening agents. Typically, the compound is milled into a vinyl plastic before fabrication in order to retard the deterioration of the plastic by sunlight.

The compounds of this invention are also useful as synthetic intermediates. Reaction of these compounds with the appropriate reagent leads to herbicidal materials described in Ser. No. 364,309, filed May 1, 1964, now Patent No. 3,235,363.

The uracils of Formula 1 can be prepared by methods heretofore described in the literature. For example, one method for the preparation of these compounds is illustrated by the following equations:

(2) $$CH_3C=\overset{H}{\underset{NH_2}{C}}-COOCH_3 + (CH_3)_2CHNCO \longrightarrow CH_3C=\overset{H}{\underset{\underset{\underset{\underset{CH(CH_3)_2}{NH}}{C=O}}{NH}}{C}}-COOCH_3$$

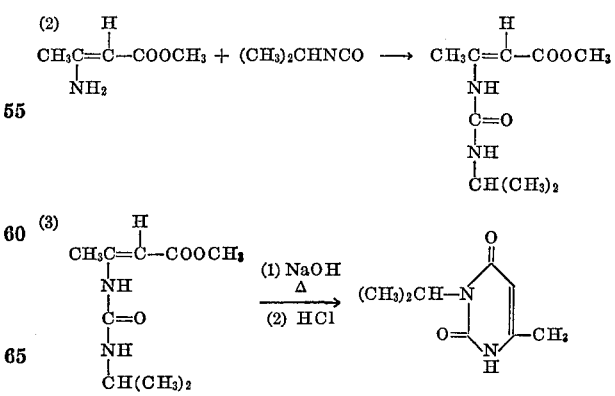

For more general details, note the publication by Behrend and Myer in Ann., 314, 219 (1901) and also Ber., 33, 622 (1900).

In the method of Equations 2 and 3, the esters of β-amino-α,β-unsaturated acids are first prepared by reacting the corresponding β-keto esters with aqueous ammonia [Conrad and Epstein, Ber., 20, 3054 (1887)]. These β-amino-α,β-unsaturated esters are then reacted with an isocyanate in an inert solvent such as toluene or xylene, and heated for a short interval of time at reflux temperature.

The reaction mixture is chilled, filtered, and the filtrate distilled to remove the solvent. Generally, a viscous liquid residue remains which is crude 3-(3-substituted-ureido)-α,β-unsaturated ester. This can be reacted without further purification with an aqueous alcoholic alkaline solution at reflux temperature to bring about the desired uracil ring closure. At this point, the reaction is made slightly acidic with a strong acid such as hydrochloric acid and distilled to remove the alcohol. After the remaining aqueous solution has been chilled, the corresponding substituted uracil separates as an essentially pure solid.

These uracils may be halogenated in their 5-position as illustrated by Equation 4.

(4)
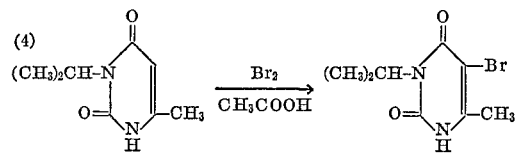

For more details of a general nature see J.A.C.S. 61, 1015 (1939); Ann., 305, 314; Ann., 352, 242; and Ann., 441, 192.

Specific details for these reactions are provided in the compound preparation examples hereof.

Another method for preparing the uracil starting reactants for halogenation is illustrated by the following equations:

(5)    $CH_3$    O          O                       benzene +
       |         ||         ||                      acid catalyst
   $CH_3CH_2CH-NHCNH_2 + CH_3C-CH_2COOC_2H_5$    ──────────→
                                                        Δ
                                                       $-H_2O$ $CH_3$    O    $CH_3$
           |         ||   |
       $CH_3CH_2CH-NHCNHC=CHCOOC_2H_5$ (6)    $CH_3$    O    $CH_3$           (1)  alkali metal
       |         ||   |                     alcoholate
   $CH_3CH_2CH-NHCNHC=CHCOOC_2H_5$    ──────────→
                                        (2)  $H^⊕$

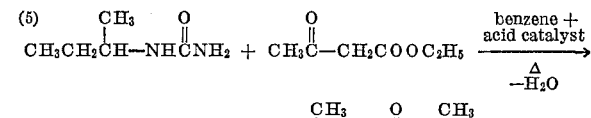

According to Equations 5 and 6, an appropriately substituted urea is reacted with a β-keto ester or an α-substituted β-keto ester substituted with such radicals as fluorine, chlorine, or bromine, and an acid catalyst, at reflux in a solvent from which water is removed continuously. After the water has all been removed, the solution is stripped and taken up in ethanol containing a base such as sodium methoxide. After a few minutes reflux, the solvent is removed, and the residual oil taken up in water and acidified, whereupon the desired product separates in crystalline form.

3-alkyl-5-fluoro-6-methyluracils are preferably prepared according to Equations 5 and 6.

The product formed at the end of the first step, i.e., after the water has been removed, is a ureido compound of the type referred to in Equation 5. It can be isolated and purified if desired; however, this is not necessary or advantageous.

These ureido compounds referred to above are believed to exist in either or both of two tautomeric forms, as illustrated in the following equation:

(7) 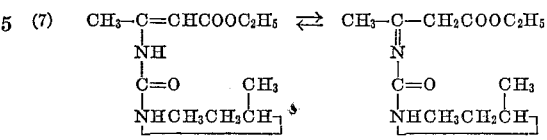

3-substituted-6-methyluracil starting reactants can also be formed by condensing an alkyl or aryl carbamate with an N-substituted acetoacetamide in the presence of an acid catalyst followed by alkaline ring closure of the intermediate substituted crotonamides.

3-substituted-6-methyluracil starting reactants may be chlorinated according to the following procedure:

(8)
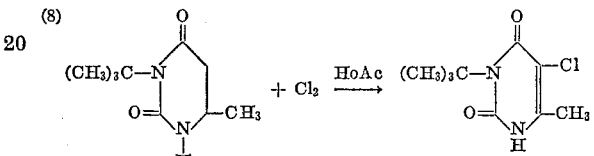

They may also be iodinated as follows:

(9)
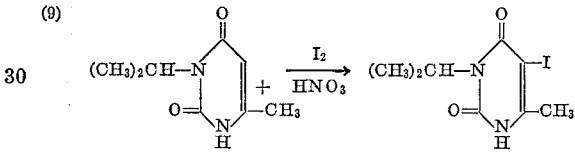

The salts of the uracil compounds of Formula 1 are prepared by conventional methods such as dissolving the free uracil in an aqueous or nonaqueous solution of at least an equimolar amount of a base or basic salt containing the desired cation. For example, a sodium salt can be prepared by dissolving the uracil in water containing an equimolar amount of sodium hydroxide. The salt can then be isolated from the solution by removal of the water.

Quaternary ammonium salts of the compounds of Formula 1 are prepared by reacting the substituted uracil with an appropriate quaternary ammonium hydroxide. Illustrative of such hydroxides are tetramethyl ammonium hydroxide, tetraethyl ammonium hydroxide, tetrabutyl ammonium hydroxide, dodecyltrimethyl ammonium hydroxide, and dimethyl piperidylium ammonium hydroxide. Since these hydroxides are generally available in solution, the reaction is most conveniently carried out in the same solvent. If the solvent-free salt is desired, it can be easily prepared by removing the solvent.

Alternatively, the quaternary ammonium salts of the uracils can be prepared in a dry inert solvent such as toluene or xylene. The appropriate quaternary ammonium halide is then added with stirring and, if necessary, mild heating. The sodium halide which forms is removed by filtration, leaving the quaternary ammonium salt of the uracil in solution. If desired, the solvent-free salt can be prepared by removing the solvent, preferably in vacuo.

The compounds of the present invention can be readily formulated for herbicidal use by incorporating them with suitable adjuvants.

The amount of active compound in such preparations can vary over a wide range according to need. Generally speaking they will contain from about 0.5 to 95%, by weight of active ingredient.

Powder and dust preparations can be made by mixing compounds of the invention with finely-divided solids such as talcs, natural clays, pyrophyllite, diatomaceous earth; flours such as walnut shell, wheat, redwood, soya bean and cotton seed; or inorganic substances such as fine silica, magnesium carbonates, calcium carbonate, calcium phosphates, sufur and lime. These preparations are made by thoroughly blending the active ingredient and the solid. The particles in such preparations are preferably less than 50 microns in average diameter.

Water-soluble preparations can be prepared by mixing a compound with an alkaline solubilizing agent. Solid bases having a pH of at least 9.5 in a 1% aqueous solution, such as sodium or potassium phosphates, silicates, carbonates, borates, oxides or hydroxides, are suitable. The preparations can contain from 0.5 to 80% active ingredient and from 5 to 99.5% of the solubilizing agent.

The compounds of the invention can also be formulated as concentrated aqueous suspensions containing from 10 to 50% of the active ingredient. These compositions are prepared by mixing the compound with suspending agents such as bentonites or hydrated attapulgites and with surface active agents and water and milling the mixture to reduce the particle size and to disperse the suspending agent.

Granules and pellets can be made by mixing a finely divided compound with a suitable clay, moistening this mixture with from 15 to 20% by weight of water, and then extruding the mass through a suitable die under pressure. The extrusions are cut into pre-determined lengths and then dried. These pellets can be granulated if desired.

Granules or pellets can also be prepared by spraying a suspension or solution of a uracil or its salt onto the surface of a preformed granule of clay, vermiculite or other suitable granular material. If the uracil or salt is in solution, it will penetrate into the pores of the granule and so will adhere without the aid of a binding agent. When the active material is insoluble in the liquid and is carried as a suspension, it is preferable that a binding agent such as goulac, dextrin, swollen starch, glue or polyvinyl alcohol be added. In either case, the granule is then dried and ready for use.

Compositions of the actives can also be prepared with nonaqueous liquids. Aliphatic and aromatic hydrocarbons, especially those derived from petroleum and having boiling points of from 125° C. to 400° C. are preferred. Hydrocarbons having lower boiling points should not be used because of their undesirable volatilization characteristics and flammability. Such compositions may be solutions or suspensions depending upon choice of nonaqueous carrier, choice of active, and desired concentrations. The more concentrated compositions are suspensions, and are made by milling the components in a mill such as a pebble mill until the particles have average diameters of from 1 to 50 microns, preferably 5 to 20 microns.

The herbicidal preparations, whatever physical form they take, can also contain a surface-active agent. The surfactant renders the preparations readily dispersible in liquids and improves their action on waxy leaves and the like. For general application, surface-active agents are used in the preparations at concentrations of from about 1 to 10%, by weight. Levels of from 0.5 to 6 parts of surfactant for each part of uracil, however, give unusual and unexpected results. Preparations having these higher levels of surfactants show greater herbicidal effectiveness than can be expected from a consideration of activity of the components used separately.

The term "surface-active agent" is intended to include wetting agents, dispersing agents, suspending agents and emulsifying agents. Surface-active agents suitable for use are set forth in "Detergents and Emulsifiers Annual 1965," John W. McCutcheon, Inc., Morristown, N.J. Other surface-active agents which can be used in these preparations are listed in U.S. Patents 2,139,276; 2,412,510; 2,426,417; and 2,655,447.

The preparations can also optionally contain adhesives such as gelatin, blood albumin and such resins as rosin alkyd resins. These increase retention and tenacity of deposits following application.

The salts of the uracils of Formula 1 are especially advantageous for use as herbicides because they are soluble in water and can be applied as aqueous solutions.

The herbicidal compounds of this invention can be combined with each other and with other known herbicides to give compositions which have advantages over the individual components.

Among the known herbicides which can be combined with the compounds of the invention are:

SUBSTITUTED UREAS 3-(3,4-dichlorophenyl)-1,1-dimethylurea
3-(4-chlorophenyl)-1,1-dimethylurea
3-phenyl-1,1-dimethylurea
3-(3,4-dichlorophenyl)-3-methoxy-1,1-dimethylurea
3-(4-chlorophenyl)-3-methoxy-1,1-dimethylurea
3-(3,4-dichlorophenyl)-1-n-butyl-1-methylurea
3-(3,4-dichlorophenyl)-1-methoxy-1-methylurea
3-(4-chlorophenyl)-1-methoxy-1-methylurea
3-(3,4-dichlorophenyl)-1,1,3-trimethylurea
3-(3,4-dichlorophenyl)-1,1-diethylurea
3-(p-chlorophenoxyphenyl)-1,1-dimethylurea These ureas can be mixed with the compounds of this invention in proportions of from 1:4 to 4:1, respectively, the preferred ratio being 1:2 to 2:1.

SUBSTITUTED TRIAZINES 2-chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2-diethylamino-4-isopropylacetamido-6-methoxy-s-triazine
2-isopropylamino-4-methoxyethylamino-6-methylmercapto-s-triazine
2-methylmercapto-4,6-bis(isopropylamino)-s-triazine
2-methylmercapto-4,6-bis(ethylamino)-s-triazine
2-methylmercapto-4-ethylamino-6-isopropylamino-s-triazine
2-methoxy-4,6-bis(ethylamino)-s-triazine
2-methoxy-4-ethylamino-6-isopropylamino-s-triazine
2-chloro-4,6-bis(isopropylamino)-s-triazine These triazines can be mixed with the compounds of this invention in proportions of from 1:4 to 4:1, respectively, the preferred ratio being 1:2 to 2:1.

PHENOLS

Dinitro-o-sec-butylphenol and its salts
Pentachlorophenol and its salts

These phenols can be mixed with the compounds of this invention in the proportions of 1:10 to 20:1, respectively, the preferred ratio being 1:5 to 5:1.

CARBOXYLIC ACIDS AND DERIVATIVES

The following carboxylic acids and derivatives can be mixed with the compounds of this invention in the listed proportions:

A 2,3,6-trichlorobenzoic acid and its salts
2,3,5,6-tetrachlorobenzoic acid and its salts
2-methoxy-3,5,6-trichlorobenzoic acid and its salts
2-methoxy-3,6-dichlorobenzoic acid and its salts
3-amino-2,5-dichlorobenzoic acid and its salts
3-nitro-2,5-dichlorobenzoic acid and its salts
2-methyl-3,6-dichlorobenzoic acid and its salts
2,4-dichlorophenoxyacetic acid and its salts and esters
2,4,5-trichlorophenoxyacetic acid and its salts and esters
(2-methyl-4-chlorophenoxy)acetic acid and its salts and esters
2-(2,4,5-trichlorophenoxy)propionic acid and its salts and esters
2-(2,4,5-trichlorophenoxy)ethyl-2,2-dichloropropionate
4-(2,4-dichlorophenoxy)butyric acid and its salts and esters 4-(2-methyl-4-chlorophenoxy)butyric acid and its salts and esters
2,3,6-trichlorobenzyloxypropanol mixed in a 1:16 to 8:1 ratio, preferably a 1:4 to 4:1 ratio.

B 2,6-dichlorobenzonitrile mixed in a 1:4 to 4:1 ratio, preferably a 1:3 to 3:1 ratio.

C

Trichloroacetic acid and its salts mixed in a 1:2 to 25:1 ratio, preferably a 1:1 to 8:1 ratio.

D 2,2-dichloropropionic acid and its salts mixed in a 1:4 to 8:1 ratio, preferably a 1:2 to 4:1 ratio.

E

N,N-di(n-propyl)thiolcarbamic acid, ethyl ester
N,N-di(n-propyl)thiolcarbamic acid, n-propyl ester
N-ethyl-N-(n-butyl)thiolcarbamic acid, ethyl ester
N-ethyl-N-(n-butyl)thiolcarbamic acid, n-propyl ester mixed in a 1:2 to 24:1 ratio, preferably a 1:1 to 12:1 ratio.

F

N-phenylcarbamic acid, isopropyl ester
N-(m-chlorophenyl)carbamic acid, isopropyl ester
N-(m-chlorophenyl)carbamic acid, 4-chloro-2-butynyl ester mixed in a 1:2 to 24:1 ratio, preferably a 1:1 to 12:1 ratio.

G 2,3,6-trichlorophenylacetic acid and its salts mixed in a 1:12 to 8:1 ratio, preferably a 1:4 to 4:1 ratio.

H 2-chloro-N,N-diallylacetamide
Maleic hydrazide mixed in a 1:2 to 10:1 ratio, preferably a 1:1 to 5:1 ratio.

INORGANIC AND MIXED INORGANIC-ORGANIC SALTS

The following salts can be mixed with the compounds of the invention in the listed proportions:

A

Calcium propylarsonate
Disodium monomethylarsonate
Octyl-dodecylammoniummethylarsonate
Dimethylarsinic acid mixed in a 1:4 to 4:1 ratio, preferably at 1:2 to 2:1 ratio.

B

Sodium arsenite mixed in a 1:5 to 40:1 ratio, preferably a 1:4 to 25:1 ratio.

C

Lead arsenate
Calcium arsenate mixed in a 150:1 to 600:1 ratio, preferably a 100:1 to 400:1 ratio.

D

Sodium tetraborate hydrated, granulated
Sodium metaborate
Sodium pentaborate
Polyborchlorate
Unrefined borate ore such as Borascu mixed in a 3:1 to 1500:1 ratio, preferably a 6:1 to 1000:1 ratio.

E

Ammonium thiocyanate mixed in a 1:10 to 20:1 ratio, preferably a 1:5 to 5:1 ratio.

F

Sodium chlorate mixed in a 1:1 to 40:1 ratio, preferably a 2:1 to 20:1 ratio.

G

Ammonium sulfamate mixed in a 1:1 to 100:1 ratio, preferably a 1:1 to 50:1 ratio.

OTHER ORGANIC HERBICIDES

These organic herbicides can be mixed with the compounds of the invention in the listed proportions:

A 1,1'-ethylene-2,2'-dipyridylium cation
1,1'-ethylene-4,4'-dipyridylium cation mixed in a 1:20 to 16:1 ratio, preferably a 1:5 to 5:1 ratio.

B 3-amino-1,2,4-triazole mixed in a 1:20 to 20:1 ratio, preferably a 1:5 to 5:1 ratio.

C 3,6-endoxohexahydrophthalic acid mixed in a 1:3 to 20:1 ratio, preferably a 1:2 to 10:1 ratio.

D

Hexachloroacetone mixed in a 1:2 to 16:1 ratio, preferably a 1:1 to 8:1 ratio.

E

Diphenylacetonitrile
N,N,dimethyl-α,α-diphenylacetamide
N,N-di-n-propyl-2,6-dinitro-4-trifluormethylaniline
N,N-di-n-propyl-2,6-dinitro-4-methylaniline mixed in a 1:10 to 30:1 ratio, preferably a 1:5 to 20:1 ratio.

F

0 - (2,4 - dichlorophenyl)-0-methyl - isopropylphosphoramidothiate
2,3,5,6-tetrachloroterephthalic acid, dimethyl ester mixed in a 1:4 to 20:1 ratio, preferably a 1:3 to 15:1 ratio.

G 2,4-dichloro-4'-nitrodiphenyl ether
2,3,5-trichloro-4-pyridinol
4-amino-3-5,6-trichloropicolinic acid mixed in a 1:10 to 30:1 ratio, preferably a 1:5 to 20:1 ratio.

OTHER SUBSTITUTED URACILS

These uracils can be mixed with other known herbicidal uracils, in the proportions listed below.

A 3-cyclohexyl-6-methyluracil
3-cyclohexyl-6-ethyluracil
3-cyclohexyl-6-sec-butyluracil
3-norbornyl-6-methyluracil
3-cyclopentyl-6-methyluracil
3-cyclohexyl-6-isopropyluracil mixed in a 1:4 to 4:1 ratio, preferably a 1:2 to 2:1 ratio.

B 3-cyclohexyl-5,6-trimethyleneuracil
3-sec-butyl-5,6-trimethyleneuracil
3-isopropyl-5,6-trimethyleneuracil
3-isopropyl-5,6-tetramethyleneuracil
3-isopropyl-5,6-pentamethyleneuracil mixed in a 1:6 to 6:1 ratio, preferably a 1:4 to 4:1 ratio.

was evaporated to a solid under reduced pressure. The solid was recrystallized from an ethanol-water mixture to give, as a white crystalline solid, 5-bromo-3-sec-butyl-6-methyluracil melting at 157.5 to 160° C.

The following 5-bromo uracils are similarly prepared by substituting the designated amounts of the listed uracil starting reactants for the 3-sec-butyl-6-methyluracil:

| Uracil Starting Reactant | Parts by Weight | Uracil Product |
| --- | --- | --- |
| 3-isopropyl-6-methyluracil | 168 | 5-bromo-3-isopropyl-6-methyluracil. |
| 6-methyl-3-(2-pentyl)uracil | 196 | 5-bromo-6-methyl-3-(2-pentyl)uracil. |
| 6-methyl-3-[2-(3-methylbutyl)]uracil | 196 | 5-bromo-6-methyl-3-[2-(3-methylbutyl)]uracil. |
| 6-methyl-3-(3-pentyl)uracil | 196 | 5-bromo-6-methyl-3-(3-pentyl)uracil. |
| 3-(2-hexyl)-6-methyluracil | 210 | 5-bromo-3-(2-hexyl)-6-methyluracil. |
| 6-methyl-3-[2-(3-methylpentyl)]uracil | 210 | 5-bromo-6-methyl-3-[2-(3-methylpentyl)]uracil. |
| 3-[2-(3,3-dimethylbutyl)]-6-methyluracil | 210 | 5-bromo-3-[2-(3,3-dimethylbutyl)]-6-methyluracil. |
| 6-methyl-3-[2-(4-methylpentyl)]uracil | 210 | 5-bromo-6-methyl-3-[2-(4-methylpentyl)]uracil. |
| 3-(3-hexyl)-6-methyluracil | 210 | 5-bromo-3-(3-hexyl)-6-methyluracil. |
| 6-methyl-3-[3-(2-methylpentyl)]uracil | 210 | 5-bromo-6-methyl-3-[3-(2-methylpentyl)]uracil. |
| 3-(3-heptyl)-6-methyluracil | 224 | 5-bromo-3-(3-heptyl)-6-methyluracil. |
| 6-methyl-3-[3-(4-methylhexyl)]uracil | 224 | 5-bromo-6-methyl-3-[3-(4-methylhexyl)]uracil. |
| 3-[3-(4,4-dimethylpentyl)]-6-methyluracil | 224 | 5-bromo-3-[3-(4,4-dimethylpentyl)]-6-methyluracil. |
| 6-methyl-3-[3-(5-methylhexyl)]uracil | 224 | 5-bromo-6-methyl-3-[3-(5-methylhexyl)]uracil. |
| 3-(tert-butyl)-6-methyluracil | 182 | 5-bromo-3-(tert-butyl)-6-methyluracil. |
| 6-methyl-3-[2-(2-methylbutyl)]uracil | 196 | 5-bromo-6-methyl-3-[2-(2-methylbutyl)]uracil. |
| 6-methyl-3-[2-(2-methylpentyl)]uracil | 210 | 5-bromo-6-methyl-3-[2-(2-methylpentyl)]uracil. |
| 3-[2-(2,3-dimethylbutyl)]-6-methyluracil | 210 | 5-bromo-3-[2-(2,3-dimethylbutyl)]-6-methyluracil. |
| 6-methyl-3-[3-(3-methylpentyl)]uracil | 210 | 5-bromo-6-methyl-3-[3-(3-methylpentyl)]uracil. |
| 6-methyl-3-[2-(2-methylhexyl)]uracil | 224 | 5-bromo-6-methyl-3-[2-(2-methylhexyl)]uracil. |
| 3-[2-(2,3-dimethylpentyl)]-6-methyluracil | 224 | 5-bromo-3-[2-(2,3-dimethylpentyl)]-6-methyluracil. |
| 6-methyl-3-[2-(2,3-trimethylbutyl)]uracil | 224 | 5-bromo-6-methyl-3-[2-(2,3,3-trimethylbutyl)]uracil. |
| 3-[2-(2,4-dimethylpentyl)]-6-methyluracil | 224 | 5-bromo-3-[2-(2,4-dimethylpentyl)]-6-methyluracil. |
| 6-methyl-3-[3-(3-methylhexyl)]uracil | 224 | 5-bromo-6-methyl-3-[3-(3-methylhexyl)]uracil. |
| 3-[3-(2,3-dimethylpentyl)]-6-methyluracil | 224 | 5-bromo-3-[3-(2,3-dimethylpentyl)]-6-methyluracil. |
| 6-methyl-3-[3-(3-methylheptyl)]uracil | 233 | 5-bromo-6-methyl-3-[3-(3-methylheptyl)]uracil. |
| 3-[3-(3,4-dimethylhexyl)]-6-methyluracil | 238 | 5-bromo-3-[3-(3,4-dimethylhexyl)]-6-methyluracil. |
| 3-[3-(3,5-dimethylhexyl)]-6-methyluracil | 238 | 5-bromo-3-[3-(3,5-dimethylhexyl)]-6-methyluracil. |
| 6-methyl-3-[3-(3,4,4-trimethylpentyl)]uracil | 238 | 5-bromo-6-methyl-3-[3-(3,4,4-trimethylpentyl)]uracil. |
| 6-methyl-3-[3-(3-methylnonyl)]uracil | 266 | 5-bromo-6-methyl-3-[3-(3-methylnonyl)]uracil. |
| 6-methyl-3-(1-methylheptyl)uracil | 238 | 5-bromo-6-methyl-3-(1-methylheptyl)uracil. |
| 3-(1,1-dimethylhexyl)-6-methyluracil | 238 | 5-bromo-3-(1,1-dimethylhexyl)-6-methyluracil. |
| 6-methyl-3-[3-(3-methyloctyl)]uracil | 252 | 5-bromo-6-methyl-3-[3-(3-methyloctyl)]uracil. |
| 6-methyl-3-(3-octyl)uracil | 238 | 5-bromo-6-methyl-3-(3-octyl)uracil. |

C 3-cyclohexyl-5-bromouracil
3-cyclohexyl-5-chlorouracil
3-isopropyl-5-bromouracil
3-sec-butyl-5-bromouracil
3-sec-butyl-5-chlorouracil mixed in a 1:6 to 6:1 ratio, preferably a 1:2 to 2:1 ratio.

D 3-isopropyl-1-trichlormethylthio-5-bromo-6-methyluracil
3 - cyclohexyl-1-trichloromethylthio-5-bromo-6-methyluracil
3-sec-butyl-1-acetyl-5-bromo-6-methyluracil
3-isopropyl-1-acetyl-5-bromo-6-methyluracil
3 - isopropyl-1-trichloromethylthio-5-chloro-6-methyluracil mixed in a 1:4 to 4:1 ratio, preferably a 1:2 to 2:1 ratio.
All of the foregoing ratios are weight ratios.

Many of the above materials, for example, borates, arsonates, and dinitro sec-butylphenol act as bacteriocides and fungicides. Addition of these compounds, or compounds with similar biological action, inhibit the degradation and inactivation of the herbicidal uracils by soil micro organisms, and consequently, extend their herbicidal usefulness.

*Examples*

In order that the invention may be better understood, the following examples illustrating the preparation of compounds and the preparation and use of herbicidal compositions containing them are given:

EXAMPLE 1.—PREPARATION OF 5-BROMO-3-SEC-BUTYL-6-METHYLURACIL

A solution of 182 parts of 3-sec-butyl-6-methyluracil in 700 parts of acetic acid containing 82 parts of sodium acetate was treated with 160 parts of bromine. After standing overnight, the mixture which contained some solid,

EXAMPLE 2.—PREPARATION OF 3-TERT-BUTYL-5-CHLORO-6-METHYLURACIL

Eight parts of chlorine are added to a stirred solution of 18.2 parts of 3-tert-butyl-6-methyluracil in 100 parts of glacial acetic acid. The temperature is maintained below 30° C. during this addition. The solution is stirred ½ hour longer at room temperature, then poured into ice water, whereupon a solid separates. This solid is collected by filtration, washed with water, dried, and is then recrystallized from a mixture of cyclohexane and ethyl acetate. The pure 3-tert-butyl-5-chloro-6-methyluracil melts at 184° C.

EXAMPLE 3.—PREPARATION OF 3-SEC-BUTYL-5-CHLORO-6-METHYLURACIL

A mixture of 182 parts of 3-sec-butyl-6-methyluracil, 500 parts of glacial acetic acid, and 82 parts of sodium acetate was stirred at 20–25° C. while 150 parts of sulfuryl chloride were added over a one-hour period. Stirring was continued for one hour longer, after which the reaction mixture was evaporated and the resulting solid recrystallized from an ethanol-water mixture to give 3-sec-butyl-5-chloro-6-methyluracil as a crystalline solid melting at 153–155° C.

5-chloro uracils corresponding to the 5-bromo uracil counterparts listed in the table under Example 1 above can be readily prepared in a fashion similar to either Example 2 or this example by substituting the amounts of the 3,6-substituted uracil starting reactants, where different, shown in the table of Example 1 for the 3-tert-butyl-6-methyluracil of Example 2 or the 3-sec-butyl-6-methyluracil hereof.

EXAMPLE 4.—PREPARATION OF 5-IODO-3-ISOPROPYL-6-METHYLURACIL

A mixture of 168 parts by weight of 3-isopropyl-6-methyluracil, 1000 parts by weight of acetic acid, and 253 parts by weight of iodine is stirred at 100° C. as 75 parts by weight of fuming nitric acid are gradually added. When the addition is complete, the dark colored solution is refluxed for about one-half hour and then cooled to ice-bath temperature.

Excess iodine which precipitates is filtered off and the filtrate is diluted with 400 parts by weight of cold water. The iodine remaining in solution is reduced to iodide ion by adding a saturated solution of sodium bisulfite until the solution becomes colorless.

The aqueous solution is extracted with 6000 parts by weight of methylene chloride. The organic layer is separated, washed with saturated sodium bicarbonate solution, and then dried with 200 parts by weight of magnesium sulfate.

The 5-iodo-3-isopropyl-6-methyluracil is recrystallized from acetonitrile. It melts at 181° C.

5-iodouracils corresponding to the 5-bromouracil counterparts listed in the table under Example 1 above can be readily prepared in a fashion similar to this example by substituting the amounts of the 3,6-substituted uracil starting reactants, where different, shown in the table of Example 1 for the 3-isopropyl-6-methyluracil hereof.

EXAMPLE 5.—PREPARATION OF 5-FLUORO-3-ISOPROPYL-6-METHYLURACIL

A mixture of 102 parts of isopropyl urea, 700 parts of benzene, 4 parts of p-toluenesulfonic acid, and 148 parts of ethyl α-fluoroacetoacetate (caution, highly toxic) is stirred at reflux for eight hours while the water given off by the reaction is collected in a suitable trap by azeotropic distillation.

The water is removed and a solution of 64.8 parts of sodium methoxide in 200 parts of absolute ethanol is gradually added. Refluxing is continued for an additional half hour. The mixture is cooled to about 15° C. To this is added 1200 parts of ice and water, and 5 parts of activated charcoal. After a short period of rapid stirring, the mixture is filtered. The aqueous layer containing the sodium salt of the desired product is separated and gradually acidified to a pH 5 with dilute sulfuric acid while stirring.

The resulting white solid is filtered off and recrystallized from water containing 10% ethanol. After filtering and drying the 5-fluoro-3-isopropyl-6-methyluracil thus produced melts at 176.5–177.5° C.

5-fluorouracils corresponding to the 5-bromouracil counterparts listed in the table under Example 1 above can be readily prepared by substituting the appropriate substituted ureas in equivalent amounts for the isopropyl urea used in the reaction of this Example 5.

EXAMPLE 6

| | Percent |
|---|---|
| 3-tert-butyl-5-chloro-6-methyluracil, Na salt | 20 |
| Sodium lauryl sulfate | 2 |
| Water | 78 |

The solution is prepared by dissolving the two soluble salts in the water, with agitation and adding a small amount of sodium hydroxide to maintain a pH of 12. This solution is suitable for quick dilution to desired spray levels.

Other soluble salts suitable for preparation of water concentrates are 5-bromo-3-sec-butyl-6-methyluracil, sodium salt
5-chloro-3-isopropyl-6-methyluracil, tetrabutylammonium salt
5-bromo-3-isopropyl-6-methyluracil, potassium salt
5-bromo-3-isopropyl-6-methyluracil, trimethyldodecylammonium salt This aqueous solution is used for post-emergence weed control. A concentration of 1.0 pound of active ingredient per acre in 30 gallons of water gives excellent control of crabgrass, pigweed, velvet weed, and flower-of-an hour.

At concentrations of 10 to 20 pounds per acre in 80 gallons of water, this composition gives excellent control of a wide variety of annual broadleaved and grass weeds growing in railroad yards on railroad ballast.

EXAMPLE 7

| | Percent |
|---|---|
| 5-bromo-6-methyl-3-(3-pentyl)uracil | 28.0 |
| Sodium lignin sulfonate | 15.0 |
| Hydrated attapulgite | 2.0 |
| Disodium phosphate | 0.8 |
| Sodium pentachlorophenate | 0.5 |
| Water | 53.7 |

The above ingredients are mixed and pebble-milled or sand-milled until the average particle size of the active material is substantially less than 5 microns. The resulting stable thixotropic suspension does not cake and can be readily diluted with water to form a dilute, very slow settling suspension which requires no agitation during application.

This aqueous suspension, applied as a directed spray at 1 to 3 pounds of active ingredient per acre in 30 gallons of water, gives good pre-emergence control of barnyardgrass, mustard species, and jungle rice in sugar cane.

Other compounds of the invention which can be formulated in a like manner are 5-iodo-3-isopropyl-6-methyluracil
5-chloro-6-methyl-3-(3-pentyl)uracil
5-bromo-3-sec-butyl-6-methyluracil
5-bromo-6-methyl-3-(2-pentyl)uracil
5-bromo-3-[3,5-dimethylhexyl]-6-methyluracil
5-chloro-3-[3,5-dimethylhexyl]-6-methyluracil
3-[3,5-dimethylhexyl]-5-iodo-6-methyluracil

EXAMPLE 8

| | Percent |
|---|---|
| 5-bromo-3-sec-butyl-6-methyluracil | 40 |
| Soya lecithin | 3 |
| Substantially aliphatic, low viscosity mineral oil, e.g., kerosene or diesel oil | 57 |

The oil suspension is prepared by pregrinding the active material and mixing it with the other components with agitation, or by blending all the components together, then pebble-milling or sand-milling them to reduce the particle size of the active component. The product is suitable for dilution with weed oils to form an oil spray.

This formulation is diluted with 80 gallons of an herbicidal oil such as Lion Herbicidal Oil No. 6 and applied at 12 pounds of active ingredient per acre for general overall weed control along Cyclone fences and railroad ballast.

Good control is obtained for several months. Quickgrass, cheat, witchgrass, buttonweed, and jimson weed are controlled.

Other compounds of this invention which can be formulated in a like manner are 5-bromo-3-isopropyl-6-methyluracil
5-chloro-6-methyl-3-(2-pentyl)uracil
5-bromo-3-tert-butyl-6-methyluracil

EXAMPLE 9

| | Percent |
|---|---|
| 5-chloro-3-isopropyl-6-methyluracil | 40 |
| 2,4,5-trichlorophenoxyacetic acid propylene glycol butyl ether ester | 10 |
| Mixed polyoxyethylated sorbitan monooleate and ethylenediamine dodecyl benzene sulfonate | 5 |
| Synthetic fine silica | 45 |

These ingredients are blended, micropulverized, and reblended.

This oil dispersible powder is used to maintain weed-fee areas around electric power poles by dispersing it in Lion Herbicidal Oil No. 6 and spraying it. A weed infestation of blackberry, honeysuckle, goldenrod, speedwell, poison ivy, pokeweed, corn cockle, crabgrass and panic grass is controlled by use of 15 pounds (active) per acre of this formulation in 80 gallons of oil.

EXAMPLE 10

| | Percent |
|---|---|
| 3-sec-butyl-5-chloro-6-methyluracil, Na salt | 25 |
| Granular 8–15 mesh attapulgite clay | 75 |

A granular composition is prepared by dissolving the active ingredient in water and spraying this solution on the attapulgite granules while they are tumbled. The resulting granules are then dried.

The granules are applied by hand for "spot treatment" of undesirable bunch grasses growing in agricultural areas. An application of 20 to 30 pounds of active ingredient per acre gives good control of Dallis and Vasey grass.

Other active compounds which can be formulated in a similar manner are 5-iodo-6-methyl-3-[2-(methylbutyl)]uracil
3-tert-butyl-5-fluoro-6-methyluracil
5-bromo-6-methyl-3-[2-(2-methylpentyl)]uracil

EXAMPLE 11

| | Percent |
|---|---|
| 5-bromo-3-isopropyl-6-methyluracil | 40 |
| Anhydrous sodium sulfate | 10 |
| Non-swelling Ca, Mg bentonite | 49 |
| Alkyl naphthalene sulfonate, Na salt | 1 |

These components are formulated as 4 to 8 mesh granules by blending and grinding the components, then moist-granulating them, followed by drying and screening.

The granules are broadcast at a level of 10 pounds of active ingredient per acre for the excellent control of oak brush growing on light sandy soil.

EXAMPLE 12

| | Percent |
|---|---|
| 5-chloro-3-isopropyl-6-methyluracil | 20 |
| Attapulgite clay | 78 |
| Alkyl naphthalene sulfonic acid, Na salt | 1 |
| Lignin sulfonic acid, Na salt | 1 |

These ingredients are mixed in a ribbon blender until homogeneous and then charged to a pug mill, where sufficient water is blended in to form a thick paste. The paste is discharged from the pug mill in the form of extrusions which are dried and broken by a rotary crusher into irregular granules.

Other compounds which can be formulated like Examples 11 and 12 are 5-bromo-6-methyl-3-[3-(3-methylpentyl)]uracil
5-chloro-3-[2-(2,3-dimethylbutyl)]-6-methyluracil

EXAMPLE 13

The granular compositions of Examples 11 and 12 are applied by hand or by specially built spreaders. At concentrations of 25 pounds of active ingredient per acre, they control broadleaf and grass weeds in lumber yards, along railroad rights-of-way, in fire lanes and around billboards, and in parking areas and roadsides.

They can be applied as soil treatments, at 20 pounds of active ingredient per acre, for the control of such woody plants as privet, elm, ash, oak, maple, and willow. This concentration also gives control of germinating annual weeds and established perennial weeds such as quack grass and plantain.

EXAMPLE 14

| | Percent |
|---|---|
| 3-isopropyl-5-chloro-6-methyluracil | 25 |
| Anhydrous sodium sulfate | 10 |
| Sodium lignin sulfonate | 10 |
| Ca, Mg bentonite | 55 |

These components are blended and micropulverized, then moistened with 18–20% water and extruded through die holes. The extrusions are cut into pellets and then dried.

These pellets are useful for weed control along highway guard rails, around bridges, Cyclone fences, and highway signs. They are applied by hand, at 10 to 25 pounds of active ingredient per acre. Excellent control of such woody plants as oak, maple, sweet gum, and willow is obtained.

EXAMPLE 15

| | Percent |
|---|---|
| 5-bromo-3-sec-butyl-6-methyluracil | 50 |
| $Na_2SiO_3$ anhydrous | 21 |
| $K_2CO_3$ anhydrous | 21 |
| Dioctyl sodium sulfosuccinate | 2 |
| Sodium lignin sulfonate | 5 |
| Finely divided synthetic silica | 1 |

These ingredients are blended, micropulverized and re-blended. An application of 10 pounds (active) in 80 gallons of water per acre controls crabgrass, foxtail, water grass, Indian grass, goldenrod, asters and ragweed on an industrial site.

A directed pre-emergence spray of one pound (active) in 40 gallons of water controls crabgrass, water grass, foxtail, mustard, pigweed and lambsquarter in ratoon sugar cane 12 inches high.

Other uracils which can be formulated in like manner include 5-bromo-3-isopropyl-6-methyluracil
3-tert-butyl-5-chloro-6-methyluracil
5-bromo-3-tert-butyl-6-methyluracil
5-iodo-6-methyl-3-(3-pentyl)uracil
5-chloro-6-methyl-3-(3-pentyl)uracil
5-bromo-6-methyl-3-(3-pentyl)uracil

EXAMPLE 16

| | Percent |
|---|---|
| Technical 95% 5-bromo-3-isopropyl-6-methyluracil | 85.5 |
| Alkyl naphthalene sulfonic acid, Na salt | 2.0 |
| Calcium salt of partially desulfonated lignin sulfonic acid | 0.5 |
| Powdered gypsum ($CaSO_4 \cdot 2H_2O$) | 2.0 |
| Precipitated tricalcium phosphate | 2.5 |
| Attapulgite clay | 7.5 |

These components are blended and micropulverized until the product shows less than one percent retention on a 325 mesh screen when wet screened.

This formulation, applied at the rate of 15 pounds (active) in 100 gallons of water, gives excellent control of broadleaved weeds such as plantain, dandelion, dock, smooth brome, Indian grass, and broomsedge growing along railroad rights-of-way. Excellent residual weed control is obtained.

For a tank mix, five pounds of this powder are dispersed in 60 gallons of water to which are added 10 pounds of a polyoxyethylated alkyl mercaptan. One week after application, excellent contact burn is noted on annual bluegrass, Kentucky bluegrass, seedling Johnson grass, crabgrass, ragweed, wild mustard and cocklebur growing along a fence row. Extended residual control of these species is obtained.

EXAMPLE 17

3-tert-butyl-5-chloro-6-methyluracil is formulated as a wettable powder in the manner described in Example 16. One and one half to four pounds of this formulation are dispersed in 40 gallons of water and applied as a spray to an acre of area beneath peach trees in the early spring. Extended control of many broadleaved and grassy weeds is obtained. The treated trees thrive.

EXAMPLE 18

| | Percent |
|---|---|
| Technical 95% 5-bromo-3-sec-butyl-6-methyluracil | 85.5 |
| Alkylnaphthalene sulfonic acid, Na salt | 3.0 |
| Sodium salt of partially desulfonated lignin sulfonic acid | 1.5 |
| Basic magnesium carbonate | 2.0 |
| Fine silica (silica aerogel) | 2.0 |
| Attapulgite clay | 6.0 |

These components are blended and micropulverized until the product shows less than one percent retention on a 325 mesh screen when wet screened.

Ten pounds of this formulation are dispersed in 100 gallons of herbicidal oil (e.g., Lion Herbicidal Oil No. 6). When this mixture is applied post-emergence to one acre around lumber yards, quick kill of the weed population is obtained, followed by extended residual weed control. Crabgrass, bluegrass, cinquefoil, goldenrod, Spanish needle, Bermuda grass, seedling Johnson grass and foxtail are controlled.

EXAMPLE 19

Ten pounds of 5-bromo-3-sec-butyl-6-methyluracil as the 80% wettable powder of Example 17 and 2 pounds of 4,6-dinitro-ortho-secondary butylphenol in 4 gallons of oil are blended as a tank mix and applied at 12 pounds of active herbicide per acre in 100 gallons of water to weeds growing along fence rows. Quick kill of annual and perennial broadleaf and grass weeds is obtained, with excellent residual weed control.

EXAMPLE 20

| | Percent |
|---|---|
| 5-bromo-3-sec-butyl-6-methyluracil | 3 |
| N-(m-chlorophenyl)carbamic acid, isopropyl ester | 24 |
| Sodium dodecyl benzene sulfonate | 1 |
| Sodium N-methyl-N-palmitoyl taurate | 1 |
| Attapulgite clay | 71 |

This formulation is used for the pre-emergence control of germinating annual grass and broadleaf weeds in sugar cane. An application of 4½ pounds (active) per acre gives good control of crabgrass, foxtail, rice grass, seedling Johnson grass, and pigweed, without injury to the cane.

EXAMPLE 21

The formulation of Example 6 is applied to ponds or lakes in such a manner that a uniform concentration of 5 parts per million of active material in the water is obtained. This concentration results in the control of submerged aquatic weeds such as pondweed (Potumogeton spp.), water milfoil (Myriophyllum spp.), stonewort (Chara spp.), coontail (Ceratophyllum spp.), and bladderwort (Utricularia spp.).

I claim:
1. A compound selected from the group consisting of
(a) compounds of the formula

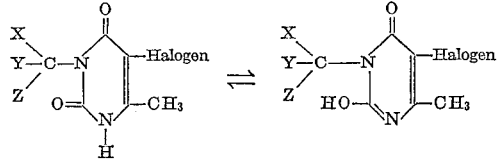

where:
X is methyl or ethyl
Y is hydrogen or methyl, and
Z is an alkyl group of 1 through 6 carbon atoms; and
(b) the sodium, potassium, lithium, and alkyl quaternary ammonium salts of the compounds of (a).
2. 5-halo-3-sec-butyl-6-methyluracil.
3. 5-halo-3-tert-butyl-6-methyluracil.
4. 5-halo-3-isopropyl-6-methyluracil.
5. 5-halo-3-(3-pentyl)-6-methyluracil.
6. 5-bromo-3-sec-butyl-6-methyluracil, sodium salt.
7. 5-chloro-3-tert-butyl-6-methyluracil.
8. 5-bromo-3-(1-ethylpropyl)-6-methyluracil.
9. 5-bromo-3-isopropyl-6-methyluracil.

References Cited

UNITED STATES PATENTS 3,227,541  1/1966  Crawford _____ 260—260 X

OTHER REFERENCES

Buckendorff, Ann., vol. 385, 1911, pages 314–327.

NICHOLAS S. RIZZO, *Primary Examiner.*

M. U. O'BRIEN, F. A. MIKA, *Assistant Examiners.*